United States Patent [19]
Nagel

[11] 3,887,849
[45] June 3, 1975

[54] PROTECTIVE CIRCUIT

[75] Inventor: Harry Henry Nagel, Westwood, N.J.

[73] Assignee: Bell Telephone Laboratories, Incorporated, Murray Hill, N.J.

[22] Filed: Nov. 2, 1973

[21] Appl. No.: 412,295

[52] U.S. Cl. ............ 317/36 TD; 317/16; 317/31 R; 317/33 SC; 317/48; 317/142 R
[51] Int. Cl. ..... H02h 3/18; H02h 3/38; H02h 11/00
[58] Field of Search........ 317/16, 18 A, 31 R, 33 R, 317/33 UR, 33 SC, 36 TD, 39, 43, 48, 49, 50, 61.5, 141 R, 142 R

[56] References Cited
UNITED STATES PATENTS

| | | | |
|---|---|---|---|
| 3,218,542 | 11/1965 | Taylor | 317/33 VR |
| 3,353,066 | 11/1967 | De Souza | 317/16 |
| 3,371,262 | 2/1968 | Bird et al. | 317/33 VR |
| 3,454,834 | 7/1969 | Giannamore | 317/33 SC |
| 3,700,967 | 10/1972 | Hoss | 317/33 SC |

Primary Examiner—J. D. Miller
Assistant Examiner—Patrick R. Salce
Attorney, Agent, or Firm—J. S. Cubert

[57] ABSTRACT

A protective circuit connected between a source and a load tests the source voltage for proper polarity and amplitude prior to permitting interconnection of the source and the load. A diode-resistor network adapted to respond to source voltage polarity and amplitude and a circuit breaker pole form a series circuit with the source whereby overvoltage or improper polarity provides sufficient current to trip the breaker. The application of source voltage to the load is delayed for a time greater than the circuit breaker tripping time so that the polarity and amplitude test of the source voltage is completed prior to connection of the source to the load.

10 Claims, 1 Drawing Figure

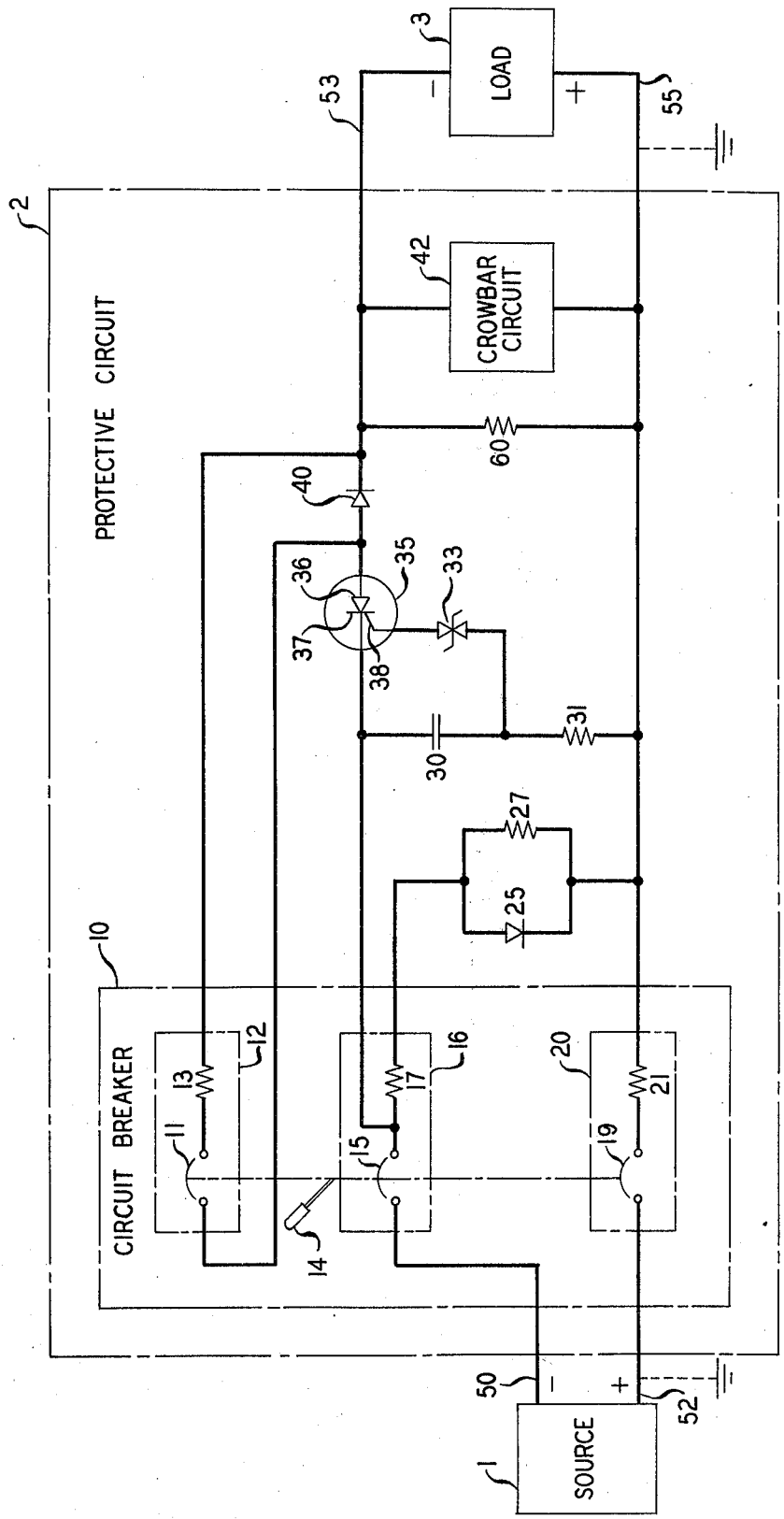

PROTECTIVE CIRCUIT

BACKGROUND OF THE INVENTION

My invention relates to circuit protecting arrangements and more particularly to a protective circuit useful in electronic equipment such as communication circuitry.

In a well-known type of protective circuit, a circuit breaker is connected between a source and a load to monitor the current flowing therebetween. A predetermined excess of current to the load through the circuit breaker causes the breaker to trip whereby the source is disconnected from the load and damage due to excessive source voltage or a short circuit in the load is limited. But, as is well known in the art, a predetermined time is required for a circuit breaker to disconnect a source from a load. During this time interval, the excessive current flows through both the source and the load. Where either the source or the load comprises sensitive electronic equipment such as low power semiconductor devices, the limited duration excessive current may result in equipment damage. If, during the initial interconnection of the source and the load, the source voltage is excessive or of the wrong polarity, the resulting excess current prior to the tripping of the interconnecting circuit breaker may cause damage to delicate electronic devices. This can occur for example in a telephone system where local telephone terminal equipment is defective or incompatible with the telephone network to which it is being connected. It is therefore desirable to provide a protective circuit that prevents interconnection of the source and the load in the event of overvoltage or incorrect polarity and that limits the duration of excessive current during operation to a safe time interval.

SUMMARY OF THE INVENTION

My invention is a protective circuit connected between a source and a load which includes a voltage sensitive device, a polarity sensitive device and a circuit breaker having power interrupting means. The power interrupting means is responsive to the detection of overvoltage or incorrect source polarity to cause the circuit breaker to disconnect whereby the source is prevented from being connected to the load. Upon the circuit breaker being rendered conductive, the application of power to the load is delayed for a predetermined time interval greater than the disconnect time of the breaker. During the predetermined time interval, the source voltage is tested for polarity and magnitude so that the detection of an overvoltage or incorrect polarity trips the breaker prior to power being applied to the load.

According to one aspect of the invention, the circuit breaker includes a plurality of current sensitive power interrupters, one of which is connected in series with a polarity sensitive device and is also connected in series with a voltage sensitive device. Upon turnon of the circuit breaker, the application of power to the load is delayed for a time interval sufficient to permit an overcurrent in the series connected interrupter to remove the breaker connection in the event of the detection of an overvoltage or incorrect polarity.

According to another aspect of the invention, the voltage sensitive device comprises a resistor; the polarity sensitive device comprises a diode; and the power delaying means comprises a resistor capacitor delay network and a semiconductor switch. The resistor capacitor network delays the turnon of the semiconductor switch connected between the breaker and the load until the test for overvoltage and incorrect polarity is completed. In this manner, no power is applied to the load upon the occurrence of an overvoltage or incorrect polarity condition during the initial connection of the source to the load.

DESCRIPTION OF THE DRAWING

The FIGURE depicts a schematic diagram of a protective circuit illustrative of the invention.

DETAILED DESCRIPTION

In the FIGURE, protective network 2 interconnects source 1 with load circuit 3. Source 1 provides a normally d.c. voltage of a predetermined polarity between leads 50 and 52 and may comprise an electronic network. Load 3 may also comprise an electronic network including sensitive semiconductor devices and require the d.c. voltage of predetermined polarity from source 1. Protective circuit 2 includes circuit breaker 10, polarity sensitive diode 25, overvoltage detection resistor 27, a delay network including capacitor 30, resistor 31 and diac 33, silicon controlled rectifier 35, diode 40 and crowbar circuit 42. Circuit breaker 10 includes poles 12, 16 and 20. Each pole such as pole 16 comprises a latch type switch 15 and a trip initiating coil 17. Latch type switches 11, 15 and 19 are mechanically connected so that single operating lever 14 causes all switches to make contact responsive to manual turnon of the lever. Upon detection of an overcurrent in one of trip initiating coils 13, 17 or 21, the mechanical connection of the poles causes each of switches 11, 15 and 19 to disconnect.

Source 1 is connected to poles 16 and 20 so that turnon of breaker 10 completes a series circuit through pole 20, the parallel combination of diode 25 and resistor 27, and pole 16. Upon turnon of the breaker, d.c. voltage is also applied to the delay network including resistor 31 and capacitor 30. One terminal of resistor 31 is connected to pole 20 and one terminal of capacitor 30 is connected to the junction between switch 15 and trip initiating coil 17. Silicon controlled rectifier 35 has its anode 36 connected to lead 53 via diode 40 and its cathode 37 connected to the junction of switch 15, coil 17 and a terminal of capacitor 30. Gate 38 is connected to the junction of capacitor 30 and resistor 31 via diac 33 which, as is well known in the art, conducts responsive to a predetermined voltage thereacross.

When circuit breaker 10 is turned on, switches 11, 15 and 19 are closed. Upon the application of d.c. power from source 1, voltage is applied to resistor 27 and diode 25. As shown in the FIGURE, a positive voltage is applied from source 1 to lead 52 and a negative voltage is applied from source 1 to lead 50. With this polarity, diode 25 is reverse biased and draws no significant current. Resistor 27 draws current proportional to the voltage of source 1. Resistor 27 is selected so that on the occurrence of a predetermined overvoltage thereacross, the current through resistor 27 causes coil 17 to trip breaker 10. In this event, contacts 11, 15 and 19 are opened and the source cannot be connected to the load. If the polarity of the voltage from source 1 is reversed so that a positive voltage is placed on lead 50 and a negative voltage is placed on lead 52, diode 25 is rendered fully conductive. Diode 25 is also rendered fully conductive if an a.c. voltage is applied thereacross. Under these conditions, the resulting current through coil 17 causes circuit breaker 10 to trip whereby contacts 11, 15 and 19 are opened.

The opening of the circuit breaker contacts responsive to an overcurrent in trip initiating coil 17 requires a predetermined time, e.g. $t1$. Resistor 31 and capacitor 30 are selected so that the turnon of silicon controlled rectifier 35 is delayed for a time $t2 > t1$ responsive to the turnon of breaker 10. Just prior to the breaker turnon, capacitor 30 is in its discharged state. Upon turnon of breaker 10, the voltage between cathode 37 and gate 38 is zero volts whereby silicon controlled rectifier 35 is maintained in its high impedance state. After breaker turnon, capacitor 30 is charged through resistor 31. The voltage applied to diac 33 at time t2 is sufficient to cause it to conduct whereby silicon controlled rectifier 35 is switched to its conductive state. Conducting silicon controlled rectifier 35 then completes the connection between source 1 and load 3 through protective circuit 2.

In the event the voltage polarity from source 1 is incorrect, the overcurrent through diode 25 causes circuit breaker 10 to disconnect by time $t1$. Since $t1$ is shorter than the time required to turn on silicon controlled rectifier 35 via the delay network including resistor 31 and capacitor 30, the tripping of the breaker occurs before any voltage has been applied to load 3 via leads 53 and 55. Thus, in accordance with the invention, the load is not subjected to improper voltage polarity. In like manner, an overvoltage e.g. of 25 percent detected in resistor 27 causes breaker 10 to trip by time $t1$ prior to turnon of silicon controlled rectifier 35 whereby the load is not subjected to an overvoltage.

When silicon controlled rectifier 35 is turned on, voltage is applied to bleeder resistor 60, crowbar circuit 42, and load 3 via pole 12 of circuit breaker 10. Bleeder resistor 60 provides a minimum current to maintain silicon controlled rectifier 35 in the conductive state. As is well known in the art, crowbar circuit 42 is responsive to a predetermined overvoltage, e.g. 5 percent across load 3, to turn on and cause a relatively large current to flow therethrough. The large current responsive to a small overvoltage causes trip initiating coil 13 to trip breaker 10 so that source 1 is disconnected from load 3. In this manner, load 3 is protected against a small overvoltage that may occur after the successful application of the power to the load.

Circuit breaker pole 20 is connected between lead 52 and lead 55. The ground reference of source 1 is generally connected to lead 52 and the ground reference of load 3 is generally connected to lead 55 whereby no appreciable current flows through trip initiating coil 21. If, however, the ground reference of source 1 is incorrectly connected to lead 50 while the ground reference of load 3 is correctly connected to lead 55, the resulting current through trip initiating coil 21 causes breaker 10 to disconnect upon turnon prior to the conduction of silicon controlled rectifier 35. In this way, protective circuit 2 prevents circuit damage due to the described incorrect ground reference connection or any other combination of incorrect ground reference connections.

What is claimed is:

1. A protective circuit for connecting a source to a load device, said protective circuit comprising in combination circuit breaking means including turnon means for rendering said circuit breaking means conductive and interrupting means for rendering said circuit breaking means nonconductive, means for detecting a first polarity voltage from said source, means for detecting a predetermined overvoltage from said source, said interrupting means being responsive to the operation of said polarity detecting means for rendering said circuit breaking means conductive, said interrupting means being responsive to the operation of said overvoltage detecting means for rendering said circuit breaking means nonconductive, means responsive to said turnon means for connecting said circuit breaking means to said load device after a predetermined time to complete the connection between the source and the load comprising a semiconductor switch having a conductive state and a nonconductive state, and means responsive to the operation of said turnon means for placing said semiconductive switch in its conductive state after said predetermined time, said predetermined time being greater than the time for rendering said circuit breaking means nonconductive whereby said source voltage is tested for polarity and overvoltage prior to connection of said load device to said source.

2. The combination according to claim 1 wherein said polarity detecting means comprises a diode connected in series with said interrupting means, said overvoltage detecting means comprises a resistor of predetermined value connected in series with said interrupting means, said turnon means comprises a latch type switch, and said interrupting means comprises current sensitive means connected to said latch type switch and to said delaying means and means responsive to a predetermined current through said current sensitive means for rendering said latch type switch nonconductive.

3. The combination according to claim 2 wherein said current sensitive means comprises a trip initiating coil, said coil being connected in series with the parallel combination of said diode and said resistor, and said means for rendering said latch type switch nonconductive comprises a mechanical linkage connected to said switch and actuated by said predetermined current through said trip initiating coil to open said latch type switch.

4. The combination according to claim 3 wherein said source comprises telephone terminal equipment and said load device comprises a telephone network.

5. A protective circuit for connecting an electrical source to a load device comprising a circuit breaker having at least one pole including a latch type switch, means for closing said latch type switch, a trip initiating coil, and a mechanical linkage responsive to the operation of said trip initiating coil for opening said latch type switch, a diode conductive responsive to a first polarity voltage, a resistor for detecting overvoltage thereacross, said diode being connected in parallel with said resistor and said parallel connected diode and resistor, said trip initiating coil, said latch type switch and said source forming a series circuit, said trip initiating coil being responsive to at least a predetermined current through one of said diode and said resistor for actuating said linkage to open said latch type switch within a first time interval, a semiconductor switch connected between said circuit breaker pole and said load device having a conductive state and a nonconductive state, and means responsive to the closing of said latch type switch for placing said semiconductor switch in its conductive state only after said first time interval.

6. A protective circuit according to claim 5 wherein said semiconductor switch comprises a silicon controlled rectifier having an anode, a cathode and a gate, said means for placing said silicon controlled rectifier in its conductive state comprises a delay circuit responsive to the closing of said latch type switch for applying a signal to said gate after said first time interval, and means for connecting said anode to said load device, said cathode being connected to said latch type switch.

7. A protective circuit according to claim 6 wherein said anode connecting means comprises a second circuit breaker pole connected between said load and said silicon controlled rectifier diode anode, and further comprising means connected across said load device for conducting at least said predetermined current through said second circuit breaker pole responsive to a predetermined overvoltage across said load device.

8. In combination, an electrical source, a load device and a protective circuit connected between said source and said load device, said protective circuit comprising first switching means connected to said source, turnon means for rendering said first switching means conductive, turnoff means for rendering said first switching means nonconductive within a first time interval, means for detecting a predetermined condition of said source, said turnoff means being responsive to the operation of said detecting means for rendering said first switching means nonconductive within said first time interval, means responsive to said turnon means for connecting said first switching means to said load after a predetermined time greater than said first time interval comprising a semiconductive switch having a conductive state and a nonconductive state, and means responsive to the operation of said turnon means for placing said semiconductive switch in its conductive state after said predetermined time, whereby said source is tested for said predetermined condition prior to connection of said source to said load.

9. A protective circuit for connecting an electrical source to a load device comprising first switching means connected to said source, turnon means for rendering said first switching means conductive, turnoff means for rendering said first switching means nonconductive within a first time interval, means for detecting a predetermined condition of said source, said turnoff means being responsive to the operation of said detecting means for rendering said first switching means nonconductive within said first time interval, means responsive to said turnon means for connecting said first switching means to said load after a predetermined time greater than said first time interval comprising a semiconductive switch having a conductive state and a nonconductive state and means responsive to the operation of said turnon means for placing said semiconductive switch in its conductive state after said predetermined time, whereby said source is tested for said predetermined condition prior to connection of said source to said load.

10. A circuit for connecting a first electrical network to a second electrical network comprising first switching means connected to said first electrical network, turnon means for rendering said first switching means conductive, turnoff means for rendering said first switching means nonconductive within a first time interval, means for detecting a predetermined condition of said first electrical network, said turnoff means being responsive to the operation of said detecting means for rendering said first switching means nonconductive within said first time interval, semiconductor switching means having a conductive state and a nonconductive state serially coupled between said first switching means and said second electrical network, and means responsive to said turnon means for rendering said semiconductor switching means conductive after the termination of said first time interval.

* * * * *